(12) United States Patent
Zhang

(10) Patent No.: US 8,586,880 B2
(45) Date of Patent: Nov. 19, 2013

(54) LEAD SHEATH

(75) Inventor: Xu Zhang, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 11 days.

(21) Appl. No.: 13/213,112

(22) Filed: Aug. 19, 2011

(65) Prior Publication Data

US 2011/0297417 A1    Dec. 8, 2011

Related U.S. Application Data

(63) Continuation of application No. PCT/CN2010/070393, filed on Jan. 28, 2010.

(30) Foreign Application Priority Data

May 24, 2009  (CN) .......................... 2009 2 0057515

(51) Int. Cl.
*H02G 3/18* (2006.01)
*H01B 7/18* (2006.01)

(52) U.S. Cl.
USPC ...................... 174/650; 174/102 D

(58) Field of Classification Search
USPC .............................................. 174/650, 102 D
See application file for complete search history.

(56) References Cited

U.S. PATENT DOCUMENTS

| | | | | |
|---|---|---|---|---|
| 3,502,917 A * | 3/1970 | Bizoe | .............................. | 310/71 |
| 4,139,727 A * | 2/1979 | Kuballa | ........................ | 174/261 |
| 5,957,735 A * | 9/1999 | Shinchi | ......................... | 439/874 |
| 6,019,628 A * | 2/2000 | Shinchi | ......................... | 439/465 |
| 2007/0066101 A1* | 3/2007 | Suzuki | ............................. | 439/99 |

* cited by examiner

*Primary Examiner* — Timothy Thompson
*Assistant Examiner* — Rhadames J Alonzo Miller
(74) *Attorney, Agent, or Firm* — Matthias Scholl P.C.; Matthias Scholl

(57) ABSTRACT

A lead sheath, including an upper jaw, and a lower jaw, the upper jaw and the lower jaw are buckled with each other. A wire outlet hole is formed at the outside of the connection between the upper jaw and the lower jaw. A wire inlet hole is formed at the inside of the connection between the upper jaw and the lower jaw. A cavity is formed between the wire outlet hole and the wire inlet hole. A protruding wire pressing rib is disposed on one of the upper jaw or the lower jaw, and the wire pressing rib extends into the cavity.

6 Claims, 7 Drawing Sheets

LEAD SHEATH

CROSS-REFERENCE TO RELATED APPLICATIONS

This application is a continuation of International Patent Application No. PCT/CN2010/070393 with an international filing date of Jan. 28, 2010, designating the United States, now pending, and further claims priority benefits to Chinese Patent Application No. 200920057515.X filed on May 24, 2009. The contents of all of the aforementioned applications, including any intervening amendments thereto, are incorporated herein by reference.

BACKGROUND OF THE INVENTION

1. Field of the Invention

The invention relates to a lead sheath, and more particularly to a lead sheath for a motor.

2. Description of the Related Art

Nowadays, lead sheaths of motors mainly operate to protect power wires or control wires from the motors, and have waterproof and dustproof functions. However, conventional lead sheaths cannot fix leads well, and the leads are loose. As the leads are pulled, electric connection between the wires and circuit boards or windings easily fails. Moreover, dustproof and waterproof effect of the lead sheaths is not good enough, structure thereof is complex, and installation thereof is inconvenient.

SUMMARY OF THE INVENTION

In view of the above-described problem, it is an objective of the invention to provide a lead sheath that features firm and reliable fixation of leads, good waterproof and dustproof effect, simple structure, and convenient installation.

To achieve the above objectives, in accordance with one embodiment of the invention, provided is a lead sheath, comprising an upper jaw, and a lower jaw, the upper jaw and the lower jaw are buckled with each other, a wire outlet hole is formed at outside of connection between the upper jaw and the lower jaw, a wire inlet hole is formed at inside of connection between the upper jaw and the lower jaw, a cavity is formed between the wire outlet hole and the wire inlet hole, a protruding wire pressing rib is disposed on one of the upper jaw or the lower jaw, and the wire pressing rib extends into the cavity.

In a class of this embodiment, multiple grooves are formed on outside of the upper jaw and the lower jaw, and the grooves are received in a housing of a motor.

In a class of this embodiment, the wire inlet hole is formed via multiple upper teeth, and multiple lower teeth staggered and engaged with each others, the upper teeth protrude from the upper jaw, and the lower teeth protrude from the lower jaw.

In a class of this embodiment, the wire outlet hole is a fixed hole.

In a class of this embodiment, the wire outlet hole is a circular hole formed by a semicircle hole disposed on outside of the upper jaw, and a semicircle hole disposed on outside of the lower jaw.

In a class of this embodiment, seal glue is injected in the cavity.

In a class of this embodiment, an end of the upper jaw is connected to that of the lower jaw via a sheet.

In a class of this embodiment, a flange is disposed on the other end of the upper jaw, a buckling ring is disposed on the other end of the lower jaw, and the flange is fit with the buckling ring.

Advantages of the invention over the prior art comprise: 1) after the upper jaw and the lower jaw are bucked with each other, the lead passes the cavity therebetween, and is pressed by the wire pressing rib and cannot be pulled, which makes fixation firm and reliable; the seal glue injected in the cavity makes dustproof and waterproof effect even better, and further fixes the lead, and thus making structure simple, and reducing production cost; 2) the grooves are formed on outside of the upper jaw and the lower jaw, and can be received in the housing of the motor, which make installation convenient, and connection reliable; 3) the wire outlet hole is a circular hole formed by the semicircle hole disposed on the outside of the upper jaw, and the semicircle hole disposed on the outside of the lower jaw, and a shape of a cross-section thereof is the same as that of the lead, which make it better to fix and seal the lead; 4) the flange is disposed on the other end of the upper jaw, the buckling ring is disposed on the other end of the lower jaw, and the flange is fit with the buckling ring, which features good integrity, and makes fixation of the lead more reliable, processing technology better, transportation and control of logistics more convenient, and installation more easier; 5) the wire inlet hole is formed via multiple upper teeth protruding from the upper jaw, and multiple lower teeth protruding from the lower jaw that are staggered and engaged with each others, which makes fixation of the lead more reliable.

DETAILED DESCRIPTION OF THE EMBODIMENTS

Further description of the invention will be given below in conjunction with specific embodiments and accompanying drawings.

Figure 1:
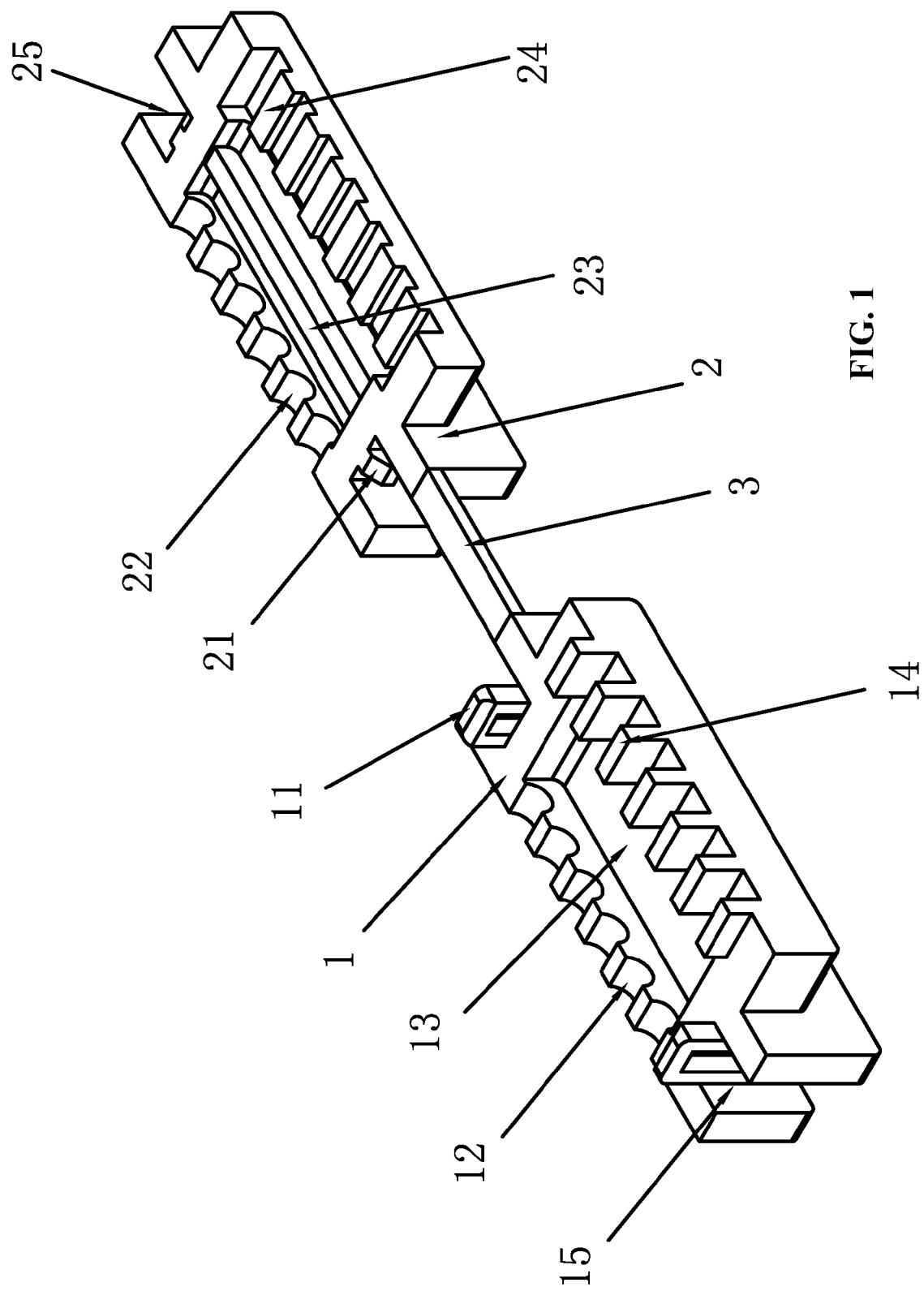
FIG. 1 is a perspective view of a lead sheath of the invention.
Figure 2:
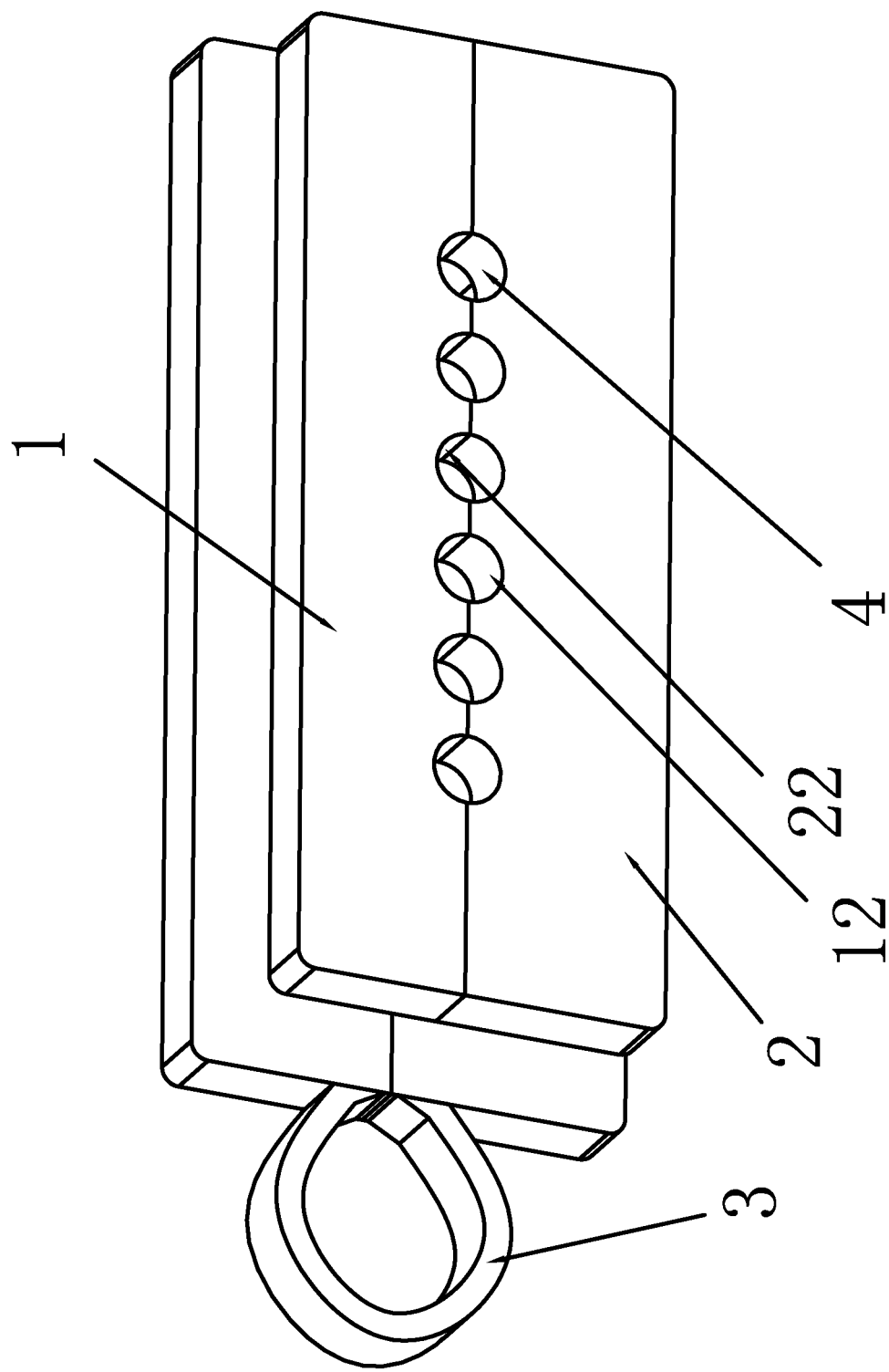
FIG. 2 is a perspective view illustrating buckling of an upper jaw with a lower jaw from an angle.
Figure 3:
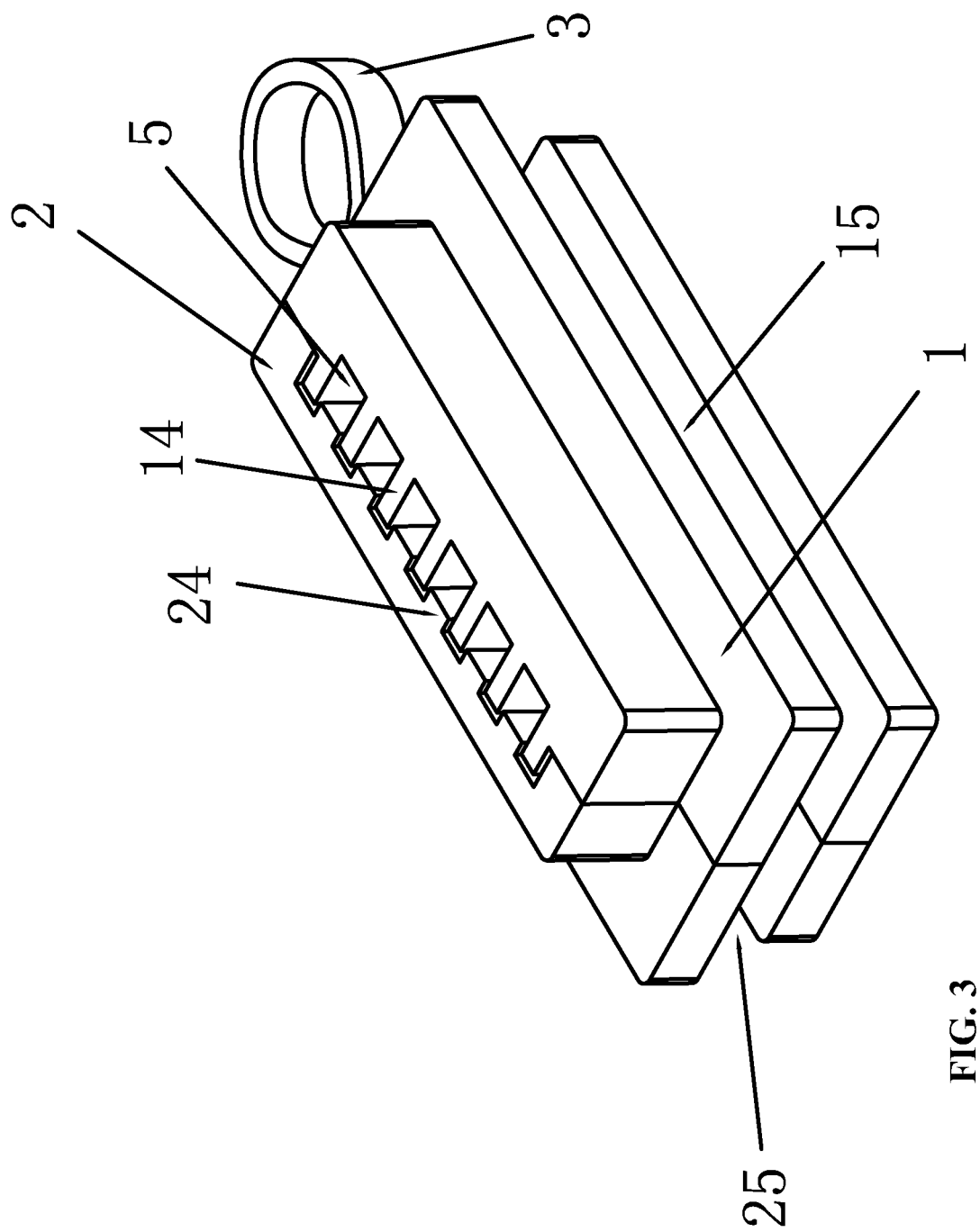
FIG. 3 is a perspective view illustrating buckling of an upper jaw with a lower jaw from another angle.
Figure 4:
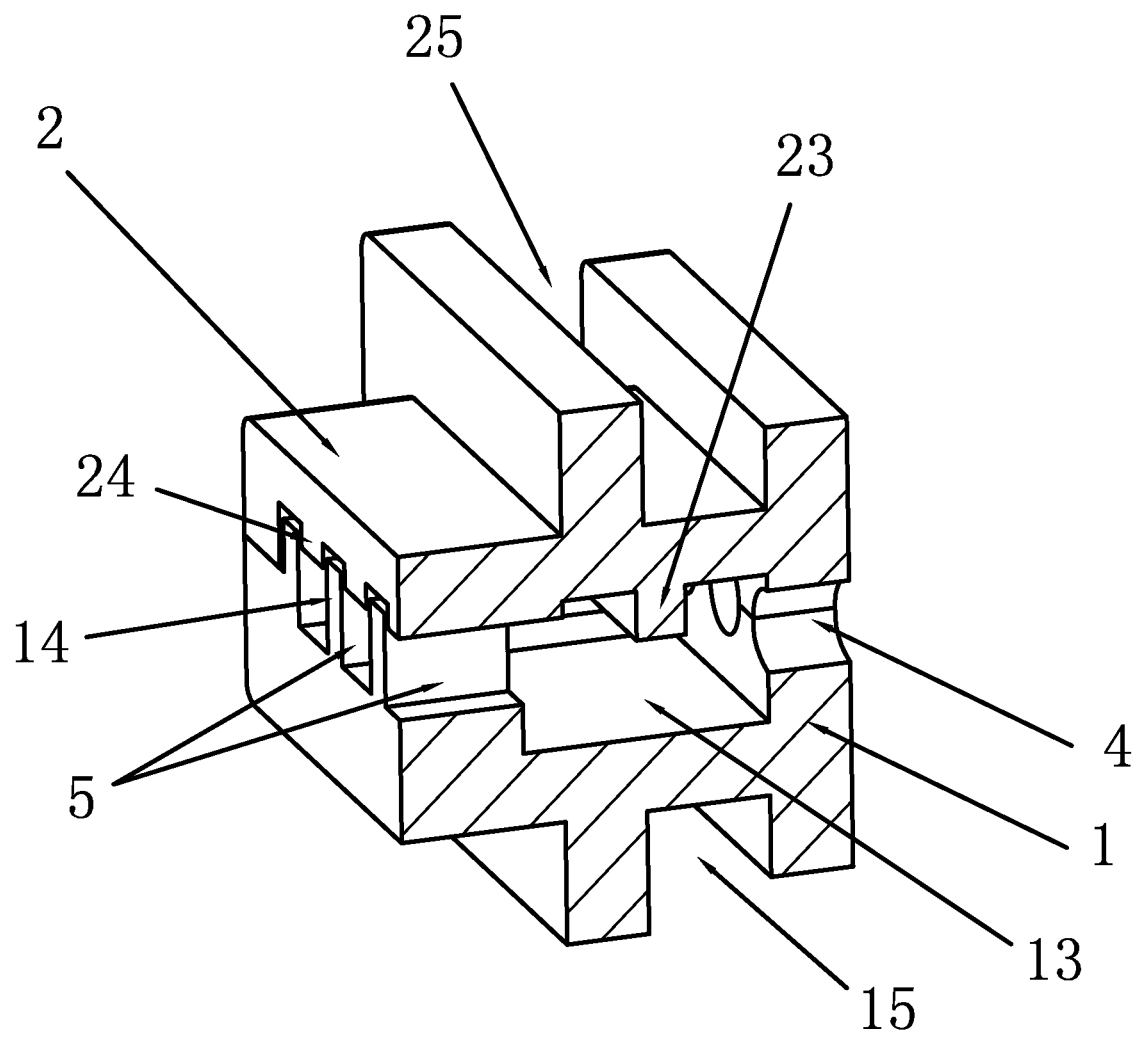
FIG. 4 is a cross-sectional view of a lead sheath of the invention.
Figure 5:
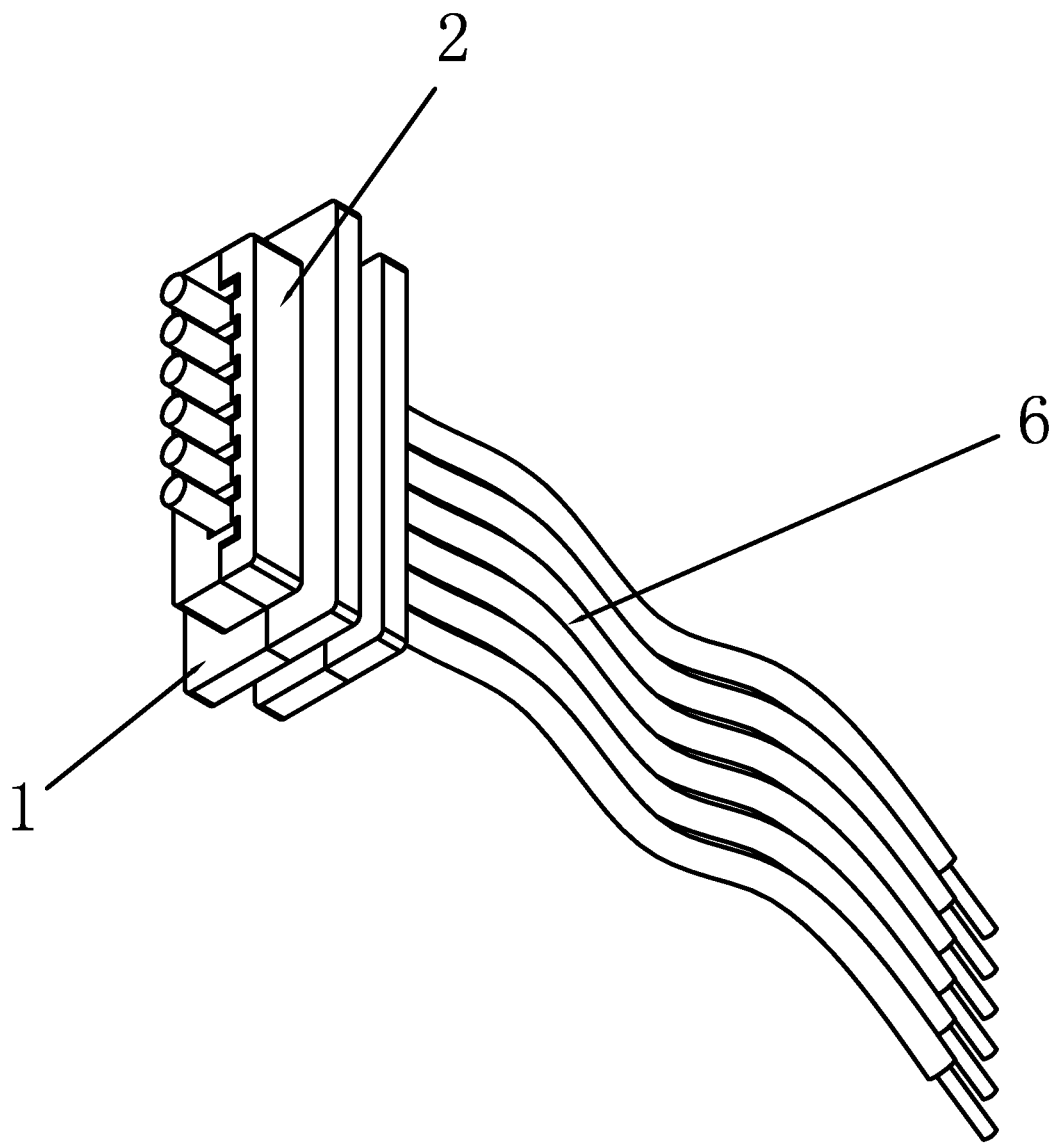
FIG. 5 is a perspective view illustrating a lead sheath with a lead.
Figure 6:
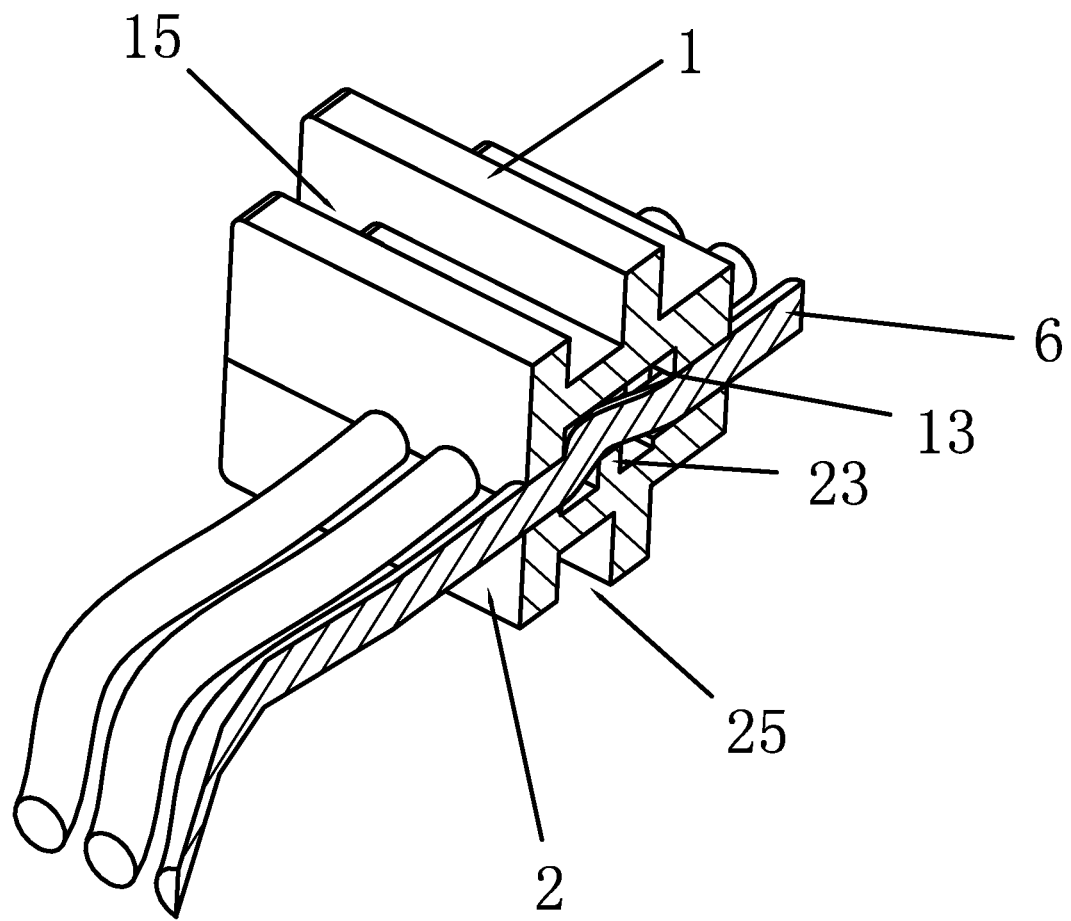
FIG. 6 is a cross-sectional view of FIG. 5.
Figure 7:
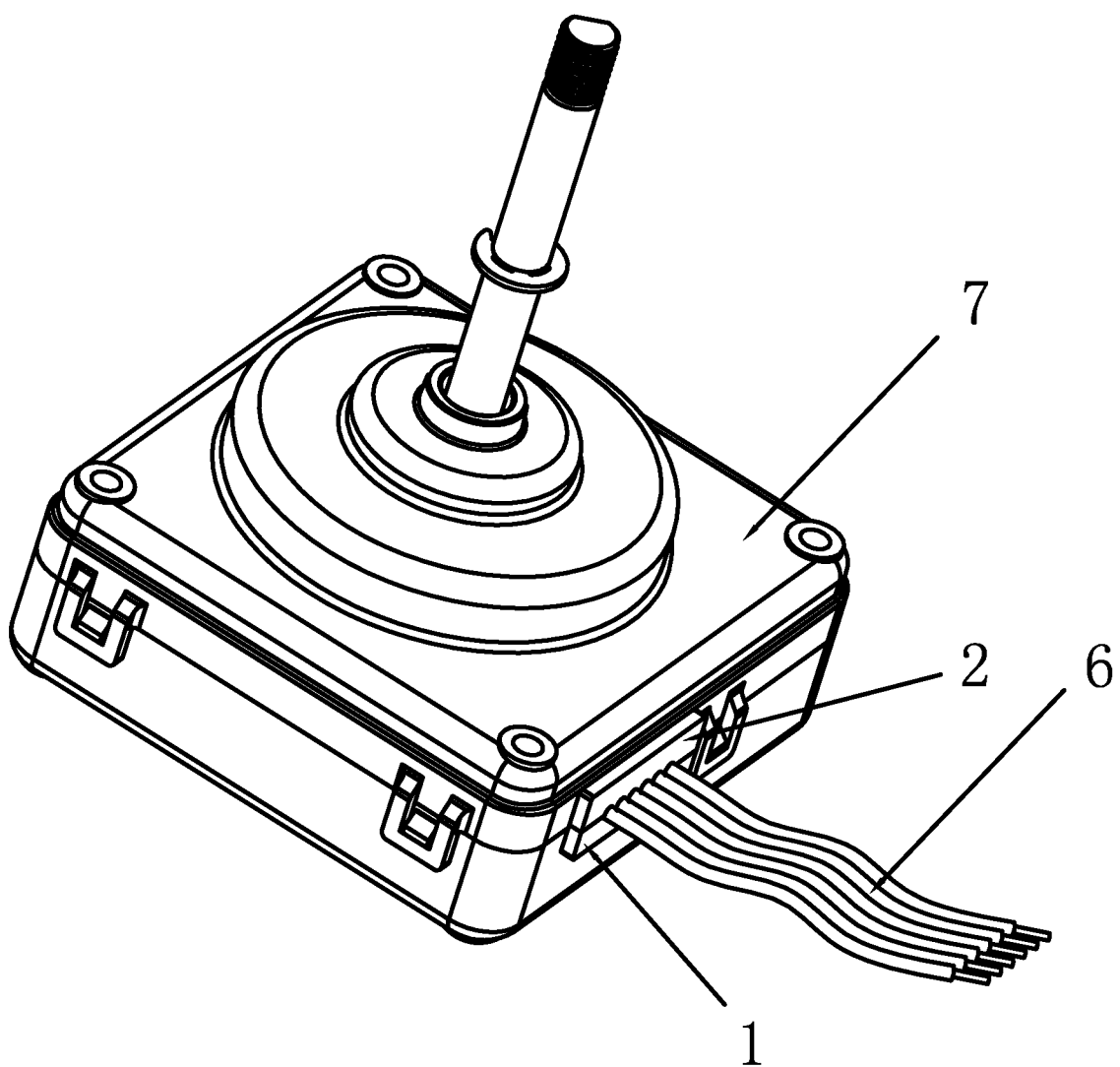
FIG. 7 illustrates operation status of the invention installed on a motor.

As shown in FIGS. 1 to 7, a lead sheath of the invention comprises an upper jaw 2, and a lower jaw 1 buckled with each other.

A wire outlet hole 4 is formed at outside of connection between the upper jaw 2 and the lower jaw 1.

A wire inlet hole 5 is formed at inside of connection between the upper jaw 2 and the lower jaw 1.

A cavity 13 is formed between the wire outlet hole 4 and the wire inlet hole 5.

A protruding wire pressing rib 23 is disposed on the lower jaw 1, and extends into the cavity 13.

Multiple grooves 15 and 25 are formed on outside of the upper jaw 2 and the lower jaw 1, and received in a housing 7 of a motor.

The wire inlet hole 5 is formed via multiple upper teeth 24, and multiple lower teeth 14 staggered and engaged with each others. The upper teeth 24 protrude from the upper jaw 2, and the lower teeth 14 protrude form the lower jaw 1.

The wire outlet hole 4 is a fixed hole.

The wire outlet hole 4 is a circular hole formed by a semicircle hole 22 disposed on outside of the upper jaw 2, and a semicircle hole 12 disposed on outside of the lower jaw 1.

Seal glue is injected in the cavity 13.

An end of the upper jaw 2 is connected to that of the lower jaw 1 via a sheet 3.

A flange 21 is disposed on the other end of the upper jaw 2, a buckling ring 11 is disposed on the other end of the lower jaw 1, and the flange 21 is fit with the buckling ring 11, whereby implementing stable and firm buckling between the upper jaw 2 and the lower jaw 1.

Operation principle of the invention is: firstly the upper jaw 2 and the lower jaw 1 are opened, then the lead 6 is disposed on the lower jaw 1, the lead 6 passes through the semicircular hole 12, the cavity 13, and the wire inlet hole 5 between two lower teeth 14, the upper jaw 2 is closed, the circular hole formed by the semicircle hole 22 disposed on outside of the upper jaw 2, and the semicircle hole 12 disposed on outside of the lower jaw 1 is tightly fit on the lead 6, which makes it better to fix and seal the lead. Meanwhile, the protruding wire pressing rib 23 disposed on the upper jaw 2 extends into the cavity 13 and presses the lead 6, whereby firmly fixing the lead 6. Then seal glue is injected in the cavity 13, which implements better sealing effect, and firm fixation of the lead 6. The upper teeth 24 protruding from the upper jaw 2, and the lower teeth 14 protruding from the lower jaw 1 are staggered and engaged with each others. The upper teeth 24 protruding from the upper jaw 2 tightly press the lead 6 in the wire inlet hole 5 between two lower teeth 14, and thus firmly fixing the lead 6.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A lead sheath, comprising:
an upper jaw, said upper jaw comprising an upper jaw front-facing side and an upper jaw back-facing side; and
a lower jaw, said lower jaw comprising an lower jaw front-facing side and an lower jaw back-facing side; wherein:
a plurality of upper teeth protrudes from said upper jaw front-facing side;
a first semicircular hole is disposed on said upper jaw back-facing side;
a plurality of lower teeth protrudes from said lower jaw front-facing side;
a second semicircular hole is disposed on said lower jaw back-facing side;
said upper jaw and said lower jaw are buckled with each other;
said plurality of upper teeth and said plurality of lower teeth are staggered with one another and engaged with one another whereby forming a wire inlet hole;
said first semicircular hole and said second semicircular hole form a wire outlet hole;
said wire outlet hole is a circular hole;
a cavity is formed between said wire outlet hole and said wire inlet hole;
a wire pressing rib is disposed on said upper jaw or said lower jaw; and
said wire pressing rib extends into said cavity.

2. The lead sheath of claim 1, wherein:
multiple grooves are formed on outside of said upper jaw and said lower jaw; and
said multiple grooves are received in a housing of a motor.

3. The lead sheath of claim 1, wherein said wire outlet hole is a fixed hole.

4. The lead sheath of claim 1, wherein a seal glue is injected in said cavity.

5. The lead sheath of claim 1, wherein an end of said upper jaw is connected to that of said lower jaw via a sheet.

6. The lead sheath of claim 5, wherein:
a flange is disposed inside said upper jaw;
a buckling ring is disposed inside said lower jaw; and
said flange is fit with said buckling ring.

* * * * *